Figure 1:
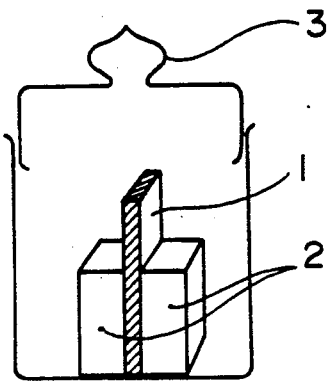

United States Patent [19]
Saitoh et al.

[11] Patent Number: 5,137,977
[45] Date of Patent: Aug. 11, 1992

[54] POLYMER COMPOSITION

[75] Inventors: Sunao Saitoh, Fujisawa; Noboru Watanabe, Yokohama, both of Japan

[73] Assignee: Nippon Zeon Co., Ltd., Tokyo, Japan

[21] Appl. No.: 634,683

[22] Filed: Dec. 27, 1990

[30] Foreign Application Priority Data

Dec. 27, 1989 [JP] Japan ................................. 1-339098

[51] Int. Cl.$^5$ .................... C08F 265/10; C08F 267/10
[52] U.S. Cl. .................................. 525/282; 525/259;
525/260; 525/263; 525/265; 525/284; 525/293
[58] Field of Search ..................... 525/282, 259, 263

[56] References Cited

U.S. PATENT DOCUMENTS

| | | | |
|---|---|---|---|
| 3,928,495 | 12/1975 | Dalton | 525/71 |
| 3,931,356 | 1/1976 | Dalton | 525/76 |
| 4,154,737 | 5/1979 | Orphanides | 548/522 |
| 4,493,777 | 1/1985 | Snyder, Jr. | 252/49.3 |
| 4,713,429 | 12/1987 | Ikuma | 526/87 |
| 4,916,196 | 4/1990 | Aoki | 526/79 |

OTHER PUBLICATIONS

Billmeyer, F. W., Jr., "Textbook of Polymer Science", 3rd Ed., (pp. 509-512) Wiley, (1984) New York.

Primary Examiner—Joseph L. Schofer
Assistant Examiner—Fred Zitomer
Attorney, Agent, or Firm—Sherman and Shalloway

[57] ABSTRACT

A polymer composition comprising a polymer or a highly saturated polymer, an organic peroxide and a maleimide derivative, said polymer being produced by radical polymerization using a sulfur-free compound as an emulsifier and a terpene type compound as a molecular weight modifier and said highly saturated polymer being obtained by hydrogenating said polymer.

4 Claims, 1 Drawing Sheet

POLYMER COMPOSITION

The present invention relates to a polymer composition comprising a polymer obtained by emulsion polymerization using a terpene type compound as a molecular weight modifier and a sulfur-free compound as an emulsifier, or comprising a highly saturated polymer obtained by hydrogenating said polymer. The polymer composition shows very low corrosiveness to metals and is suited for use particularly as a sealing material for metals.

It has hitherto been known to use, in the production of a polymer by emulsion polymerization, a mercaptan compound, a dialkyl xanthogen disulfide, a terpene compound or a halogen compound (e.g. carbon tetrachloride) as a molecular weight modifier. Of these molecular weight modifiers, n-dodecyl mercaptan or tert-dodecyl mercaptan is commonly used because of the ease of molecular weight control during polymerization and the high processability of the polymer obtained. Also, there is used, as an emulsifier, an anionic surfactant of carboxylic acid type, sulfonic acid type or the like, or a nonionic surfactant.

The polymer obtained by using a mercaptan compound (having a sulfur atom) as a molecular weight modifier, however, causes corrosion to metals, particularly copper, silver or their alloys when the polymer is in contact with them, because the polymer contains a residual sulfur compound. Therefore, when a sealing material for metals is produced with the polymer, the sealing material is insufficient in sealability. Also, the polymer obtained by emulsion polymerization using a sulfur-containing emulsifier (e.g. sulfonic acid type emulsifer) had the same problem owing to the same reason. The same problem also applies to the case where a sulfur-containing compound is used as a vulcanizing agent in vulcanization of rubbers.

The object of the present invention is to alleviate the above problem.

The present inventors made study in order to achieve the above object and, as a result, found that a composition comprising (a) a polymer obtained by polymerization using a terpene type compound as a molecular weight modifier and a sulfur-free compound as an emulsifier and (b) a maleimide derivative as a vulcanization aid shows significant improvements in discoloration, corrosion, etc. of metal surfaces.

According to the present invention there is provided a polymer composition comprising a polymer or a highly saturated polymer, an organic peroxide and a maleimide derivative, said polymer being produced by emulsion polymerization using a sulfur-free compound as an emulsifer and a terpene type compound as a molecular weight modifier and said highly saturated polymer being obtained by hydrogenating said polymer.

The monomers constituting the polymer of the present invention can be any as long as they have copolymerizable double bond(s). As such monomers, there can be mentioned, for example, conjugated diene monomers such as 1,3-butadiene, isoprene, 2,3-dimethylbutadiene, 1,3-pentadiene and the like; non-conjugated diene monomers such as vinylnorbornene, dicyclopentadiene and the like; $\alpha,\beta$-unsaturated nitrile monomers such as acrylonitrile, methacrylonitrile and the like; aromatic vinyl monomers such as styrene, $\alpha$-methylstyrene, vinyltoluene and the like; $\alpha,\beta$-unsaturated carboxylic acid monomers such as acrylic acid, methacrylic acid, itaconic acid, fumaric acid and the like; alkyl $\alpha,\beta$-unsaturated carboxylate monomers such as methyl (meth)acrylate, butyl (meth)acrylate, 2-ethylhexyl acrylate and the like; alkoxyalkyl $\alpha,\beta$-unsaturated carboxylate monomers such as methoxyethyl (meth)acrylate, butoxyethyl (meth)acrylate, ethoxypropyl acrylate and the like; cyano-substituted alkyl $\alpha,\beta$-unsaturated carboxylate monomers such as cyanomethyl (meth)acrylate, 2-cyanoethyl (meth)acrylate, cyanohexyl acrylate and the like; hydroxyalky $\alpha,\beta$-unsaturated carboxylate monomers such as 2-hydroxyethyl acrylate, hydroxypropyl acrylate and the like; aminoalkyl $\alpha,\beta$-unsaturated carboxylate monomers such as methylamino-ethyl (meth)acrylate, tert-butylaminoethyl (meth)acrylate, dimethylaminopropyl (meth)acrylate, dibutylaminoethyl (meth)acrylate and the like; unsaturated carboxylic acid ester monomers such as mono(di)ethyl maleate, mono(di)ethyl fumarate, di-2-ethylhexyl fumarate, di-n-butyl itoaconate, monomethacryloxyethyl succinate and the like; fluoroalkyl unsaturated carboxylate monomers such as trifluoroethyl (meth)acrylate, tetrafluoropropyl (meth)acrylate, octafluoropentyl (meth)acrylate, pentadecafluorooctyl (meth)acrylate and the like; N-substituted (meth)acrylamide monomers such as acrylamide, methacrylamide, N-methylol(meth)acrylamide, N-ethoxymethyl(meth)acrylamide, N,N'-dimethylol(meth)acrylamide and the like; norbornene; glycidyl methacrylate; allyl glycidyl ether; and so forth.

As the copolymer consisting of these monomers, there can be mentioned, for example, an acrylonitrilebutadiene copolymer, a styrene-butadiene copolymer, a styrene-butadiene-methacrylic acid copolymer, an acrylonitrile-butadiene-butyl acrylate copolymer, a methacrylonitrile-butadiene-methacrylic acid copolymer, an acrylonitrile-isoprene-acrylic acid-ethyl acrylate copolymer, copolymers obtained by hydrogenating the conjugated diene portions of said copolymers, a butyl acrylate-methoxy acrylate-acrylic acid copolymer, a butyl acrylate-ethoxyethyl acrylate-vinylnorbornene copolymer and a butyl acrylate-2-hydroxyethyl acrylate-vinyl chloroacetate copolymer.

As the terpene type compound used as a molecular weight modifier in the present invention, there can be mentioned, for example, terpinolene, $\alpha$-pinene, $\alpha$-terpinene, $\beta$-terpinene, $\gamma$-terpinene and myrcene. Of these compounds, terpinolene is preferable in view of the conversion in polymerization reaction. These terpene type compounds can be used alone or in admixture of two or more, depending upon the requirements for the polymer obtained. The amount of the terpene type compound used is 0.5–10 parts by weight, preferably 1.0–7.5 parts by weight per 100 parts by weight of the monomers. When the amount of the molecular weight modifier is less than 0.1 part by weight, the modifier cannot exhibit its function of molecular weight control. When the amount is more than 10 parts by weight, there arise various inconveniences, for example, the polymerization rate is small, the polymer obtained has a low Mooney viscosity, making processability low, and the production cost in high.

As the sulfur-free emulsifier, there can be mentioned, for example, carboxylic acid type emulsifers such as disproportionated potassium rosinate, potassium salts of fatty acids and the like; phosphoric acid ester type emulsifiers such as mono(polyoxyethylenealkyl) ether phosphate, di(polyoxyethylenealkyl) phosphate, tri(polyoxyethylenealkyl) phosphate, mono(polyoxyethylenealkylphenyl) phosphate, di(polyoxyethylenealkylphenyl)

phosphate and the like; and nonionic emulsifiers such as alkyl polyoxyethylene ethers and the like. Of these, phosphoric acid ester type emulsifiers are preferable. The amount of the emulsifier used is 1.0-10.0 parts by weight, preferably 1.5-7.0 parts by weight per 100 parts by weight of the monomers. When the amount of the emulsifier is less than 1.0 part by weight, the stability of polymerization is low. When the amount is more than 10.0 parts by weight, the amount of the emulsifier remaining as an impurity in the polymer obtained is large.

As the polymerization initiator used in the present invention, there can be mentioned organic peroxides such as benzoyl peroxide, cumene hydroperoxide, paramenthane hydroperoxide, lauroyl peroxide and the like; diazo compounds typified by azobisisobutyronitrile; redox type catalysts typified by an organic compound-iron sulfate combination; and so forth. The monomers, the polymerization initiator, the molecular weight modifier, etc. can be added in one portion at the start of the polymerization reaction, or can be added in portions or continuously after the start of the reaction.

As the terminator, there can be used hydroxylamine, 2,5-di-tert-butylhydroquinone, etc. However, the use of a sulfur-containing compound such as sodium dimethyldithiocarbamate, hydroxylamine sulfate or the like is not preferable.

Polymerization is usually effected at 0°-70° C., preferably 5°-50° C. in an oxygen-removed reactor. The reaction conditions such as temperature, stirring and the like can be changed appropriately in the course of reaction.

Coagulation is effected after an appropriate antioxidant has been added to the polymer latex obtained. As the coagulant, there can be used compounds such as sodium chloride, potassium chloride, tin chloride, magnesium chloride and the like. Coagulation can also be effected by the combination use of the above compound and a flocculating agent (which is generally called "a high-molecular flocculating agent). In any of these coagulation methods, it is not preferable to use a sulfur-containing compound because it will increase the metal corrosiveness of the polymer obtained.

The organic peroxide type vulcanizing agent used in vulcanization of the polymer of the present invention can be any organic peroxide usually used, for example, dicumyl peroxide, tert-butylcumyl peroxide or the like. The organic peroxides represented by the following general formulas are particularly preferable.

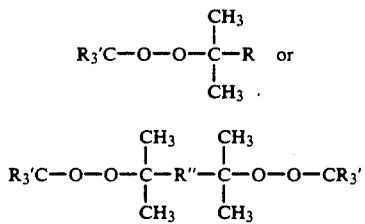

(R is an alkyl group; R's which may be the same or different, are each an alkyl group or a phenyl group; and R" is an alkylene group, a phenylene group or an ethynylene group.)

Specific examples of such organic peroxides include 2,5-dimethyl-mono-(tert-butylperoxy)-hexane, 2,5-dimethyl-2,5-di-(tert-butylperoxy)-hexane, 2,5-dimethyl-mono-(tert-butyl-peroxy)-hexyne-3,2,5-dimethyl-2,5-di -di-(tert-butylperoxy)-hexyne-3,1,3-di-(tert-butylperoxy-isopropyl)benzene, and 1,4-di-(tert-butyl-peroxy-isopropyl)benzene, but are not restricted to them. The amount of the organic peroxide added is preferably 1.0-8.0 parts by weight per 100 parts by weight of the polymer. When the amount of the organic peroxide added is more than 8 parts by weight, there arise such inconveniences that the vulcanizate causes forming during molding and the organic peroxide remaining in the polymer in an undecomposed state oxidizes metals.

Examples of the maleimide derivative used in combination with the vulcanizing agent include bismale-imide compounds such as 4,4'-bismaleimidodiphenylmethane, N,N'-m-phenylenebismaleimide, and 2,2'-bis[4-(4-maleimidophenoxy)-phenyl]propane, but are not restricted to them. These compounds have an action of accelerating the generation of radical and accordingly, when used in combination with the organic peroxide, accelerate the rate of vulcanization and can reduce the amount of the organic peroxide used. The maleimide derivative can be added to the polymerization system or the coagulation system, or can be added to the polymer obtained, with kneading. The amount of the maleimide derivative added is preferably 0.2-5.0 parts by weight per 100 parts by weight of the polymer.

The thus produced polymer composition can be used as a sealing material, an electric circuit material or a material for hose, roll or oil-resistant packing and is useful particularly as a sealing material used for areas where metal corrosion must be avoided, or as an electric circuit material.

As described above, the polymer composition of the present invention obtained by incorporating an organic peroxide and a maleimide derivative into a polymer produced by radical polymerization using a terpene type compound as a molecular weight modifier and a sulfur-free compound as an emulsifier, or into a highly saturated polymer obtained by hydrogenating said polymer, has desirable properties such as very low metal corrosiveness, no odor, no toxicity and excellent color and the like.

The present invention is hereinafter described more specifically with reference to Examples. In the Examples, parts and % are by weight unless otherwise specified.

Figure 2:
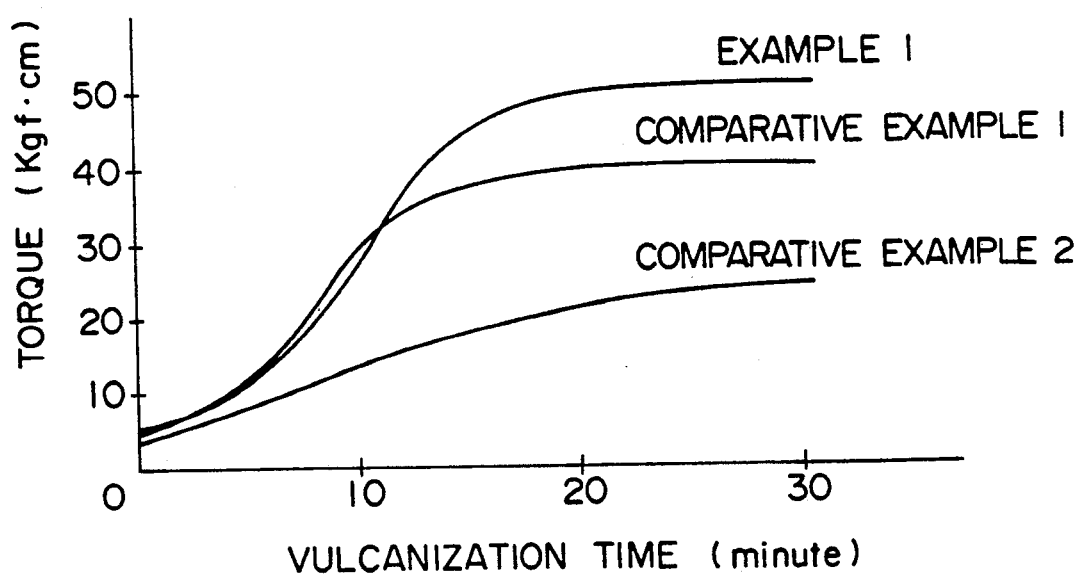

In the accompanying drawings, FIG. 1 is a schematic drawing explaining the corrosion test used in Examples; and FIG. 2 is vulcanization curves obtained with the polymer compositions of Example 1 and Comparative Examples 1 and 2 at 170° C. by a Monsanto rheometer.

REFERENCE EXAMPLE 1

Using the monomers and other materials shown in the following recipe, emulsion polymerization was effected at 8° C. in a 10-l autoclave.

| [Recipe of emulsion polymerization] | |
|---|---|
| Butadiene | 70 parts |
| Acrylonitrile | 30 parts |
| Water | 300 parts |
| Phosphoric ester type emulsifier *1 | 4 parts |
| Terpinolene *2 | 4 parts |
| Ferrous sulfate | 0.005 part |

| [Recipe of emulsion polymerization] | |
|---|---|
| Cumene hydroperoxide | 0.1 part | there were used molecular weight modifiers and emulsifiers as shown in Table 1.

The polymerization recipes used in Reference Examples 1-8 are shown in Table 1.

TABLE 1

| Polymerization recipe | | Polymer No. | | | | | | | |
|---|---|---|---|---|---|---|---|---|---|
| | | 1 | 2 | 3 | 4 | 5 | 6 | 7 | 8 |
| Monomers | Butadiene | 70 | 70 | 7 | 69 | 70 | 70 | 70 | 70 |
| | Acrylonitrile | 30 | | | 30 | 27 | 30 | 30 | 30 | 30 |
| | Styrene | | 30 | | | | | | |
| | Hydrogenated butadiene | | | 63 | | | | | |
| | Acrylic acid | | | | 4 | | | | |
| Molecular weight modifier | Terpinolene | 4 | 4 | 4 | 4 | 4 | 4 | 4 | |
| | tert-Dodecyl moercaptan | | | | | | | | 0.4 |
| Emulsifier | Phosphoric acid type emulsifier | 4 | 4 | 4 | | | | | 4 |
| | Rosin soap | | | | 4 | 4 | | | |
| | Fatty acid soap | | | | | | 4 | | |
| | Sodium dodecylbenzene-sulfonate | | | | | | | 4 | |
| Mooney viscosity of polymer | | 32 | 38 | 41 | 40 | 33 | 31 | 31 | 38 |

*1 a phosphoric monoester/diester mixture represented by the following formulas:

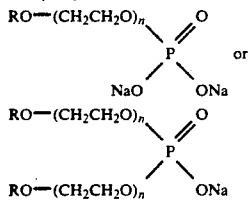

GAFAC LO-529 manufactured by Toho Kagaku
*2 1-methyl-4-isopropylidene-cyclohexene (purity, more than 90%) represented by the following formula:

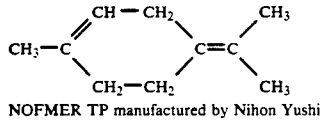

NOFMER TP manufactured by Nihon Yushi

When the polymerization conversion reached 60 %, 0.5 part, per 100 parts of the monomers, of hydroxylamine was added to terminate the polymerization reaction. Then, to the resulting latex was added 0.5 part, per 100 parts of the latex, of an anti-oxidant, after which coagulation was effected by adding calcium chloride. The resulting crumbs were water-washed and then dried by a hot air drier to obtain a copolymer No. 1.

REFERENCE EXAMPLE 2

A copolymer No. 2 was obtained by the same polymerization as in Reference Example 1 except that of the monomers of Reference Example 1, acrylonitrile was changed to styrene.

REFERENCE EXAMPLE 3

The copolymer No. 1 was dissolved in methyl isobutyl ketone. The solution was subjected to hydrogenation using a Pd/silica catalyst to hydrogenate the carbon-to-carbon double bonds in the copolymer No. 1, whereby a hydrogenated copolymer No. 3 having a hydrogenation degree of 90 % was obtained.

REFERENCE EXAMPLE 4

A copolymer No. 4 was obtained by the same polymerization as in Reference Example 1 except that there were used three monomers, i.e. acrylonitrile, butadiene and acrylic acid and, as the emulsifier, rosin soap.

REFERENCE EXAMPLES 5-8

Copolymers Nos. 5-8 were obtained by the same polymerization as in Reference Example 1 except that

EXAMPLES 1-8 AND COMPARATIVE EXAMPLES 1-4

The copolymer Nos. 1-8 obtained in Reference Examples 1-8 were compounded with various compounding agents in accordance with the recipes shown in Table 2, to obtain various polymer compositions. The compositions were measured for vulcanization property at 170° C. using a Monsanto rheometer. The results are shown in Table 2.

In order to test the corrosivenesses of the compositions to a metal plate, each of the compounds obtained above was subjected to press molding and cut into cubes of 15×15×10 mm to prepare test samples. As shown in FIG. 1, the test samples 2 were tightly adhered onto the both sides of a copper plate 1 of 1.5 mm in thickness which had been thoroughly polished and then degreased; the resulting assembly was placed in a 300-ml weighing bottle 3, and the bottle was stoppered; the bottle was allowed to stand for 24 hours in a Geer oven of 90° C.; then, the copper plate was taken out to examine the degree of corrosion and staining visually.

The results are shown in Table 2. In Table 2, ○ refers to no metal corrosion, and X refers to distinct metal corrosion.

Ordinary state properties of vulcanizate was measured by press-curing each of the polymer compositions under conditions of 160° C. and 20 minutes to obtain sample sheets of 2 mm in thickness and subjecting the sheets to a test method JIS K 6301. The results are shown in Table 2.

As is clear from Table 2, the polymer composition of the present invention causes no corrosion of copper plate. In contrast, the composition (Comparative Example 4) comprising the polymer obtained by using a sulfur compound (tert-dodecyl mercaptan) as a molecular weight modifier and the composition (Comparative Example 3) comprising the polymer obtained by using sodium dodecylbenzenesulfonate (containing a sulfur atom) as an emulsifier, causes the discoloration and corrosion of metal surface. Even the polymer obtained by using a terpene type compound as a molecular weight modifier, when compounded with a sulfur-containing vulcanizing agent or a sulfur-containing vulcanization accelerator and subjected to vulcanization, gave increased metal corrosion (Comparative Example 1).

No metal corrosion occurs when an organic peroxide is used as a vulcanizing agent (Comparative Example 2). In this case, however, the vulcanization rate is low as shown in FIG. 2 and the vulcanizate has inferior properties and cannot be put into practical use. When the vulcanization aid of Comparative Example 2 is converted to a maleimide derivative, the vulcanization rate is high as is clear from the Example 1 curve of FIG. 2 and the resulting vulcanizate has properties equivalent to those obtained by sulfur vulcanization, as shown in Comparative Example 1.

pound as an emulsifier and a terpene compound as a molecular weight modifier.

2. A polymer composition comprising 100 parts by weight of a highly saturated polymer, 1.0 to 8.0 parts by weight of an organic peroxide and 0.2 to 5.0 parts by weight of a bismaleimide compound, said highly saturated polymer being obtained by producing a polymer by radical polymerization using a sulphur-free compound as an emulsifier and a terpene compound as a molecular weight modifier and then subjecting the carbon-to-carbon double bonds contained in the polymer, to hydrogenation with a hydrogenation catalyst.

3. A polymer composition according to claim 1 or 2, wherein the emulsifier is a phosphoric acid ester emulsifier.

4. The polymer composition according to claim 1 or 2, wherein the terpene compound is terpinolene.

TABLE 2

Metal corrosivenesses and ordinary state properties of Vulcanizates

| | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| | Polymer No. | | | | | | | | | | | |
| | 1 | 2 | 1 | 1 | 3 | 4 | 5 | 6 | 1 | 1 | 7 | 8 |
| Compounding recipe | | | | | | | | | | | | |
| Polymer | 100 | 100 | 100 | 100 | 100 | 100 | 100 | 100 | 100 | 100 | 100 | 100 |
| Zinc oxide | 5 | 5 | 5 | 5 | 5 | 5 | 5 | 5 | 5 | 5 | 5 | 5 |
| stearic acid | 1 | 1 | 1 | 1 | 1 | 1 | 1 | 1 | 1 | 1 | 1 | 1 |
| Di-(2-ethylhexyl) phthalate | 5 | 5 | 5 | 5 | 5 | 5 | 5 | 5 | 5 | 5 | 5 | 5 |
| SRF carbon | 50 | 50 | 50 | 50 | 50 | 50 | 50 | 50 | 50 | 50 | 50 | 50 |
| Vulcanizing agent | | | | | | | | | | | | |
| 2,5-Dimethyl-2,5-di(tert-butylperoxy)hexane | 0.6 | 0.6 | | | 2.6 | | 0.6 | 0.6 | | 0.6 | 0.6 | 0.6 |
| 1,3-Bis(tert-butylperoxy-isopropyl)hexane | | | 0.6 | | | 0.6 | | | | | | |
| Dicumyl peroxide | | | | 2.4 | | | | | | | | |
| S | | | | | | | | | 0.2 | | | |
| HVA #2 *3 | 1.5 | 1.5 | 1.5 | 0.5 | 1.5 | 1.5 | 1.5 | 1.5 | | | | 1.5 |
| TAIC *4 | | | | | | | | | | 1.5 | | |
| TAC *5 | | | | | | | | | | | 1.5 | |
| TT *6 | | | | | | | | | | | 1.5 | |
| CZ *7 | | | | | | | | | | | 1.5 | |
| Metal corrosiveness Cu plate | | | | | | | | | X | | X | X |
| Ordinary state properties of vulcanizate | | | | | | | | | | | | |
| TB (kgf/cm$^2$) | 176 | 170 | 175 | 180 | 180 | 185 | 153 | 155 | 170 | 35 | 42 | 171 |
| EB (%) | 540 | 580 | 600 | 550 | 580 | 510 | 620 | 670 | 550 | 1100 | 1070 | 520 |
| HS (JISA) | 56 | 55 | 57 | 56 | 65 | 60 | 57 | 53 | 61 | 37 | 38 | 57 |

*3 N,N'-m-phenylenebismaleimide manufactured by Du Pont
*4 Triallyl isocyanurate
*5 Triallyl cyanurate
*6 Tetramethylthiuram disulfide
*7 N-cyclohexyl-2-benzothiazole sulfenamide

What is claimed:

1. A polymer composition comprising 100 parts by weight of a polymer, 1.0 to 8.0 parts by weight of an organic peroxide and 0.2 to 5.0 parts by weight of a bismaleimide compound, said polymer being produced by radical polymerization using a sulphur-free com-